United States Patent [19]

Hattori et al.

[11] Patent Number: 4,484,651
[45] Date of Patent: Nov. 27, 1984

[54] AIR INTAKE SYSTEM FOR MOTORIZED CYCLES

[75] Inventors: Shigeru Hattori; Tomoyuki Tagami, both of Saitama, Japan

[73] Assignee: Honda Giken Kogyo Kabushiki Kaisha, Tokyo, Japan

[21] Appl. No.: 443,602

[22] Filed: Nov. 22, 1982

[30] Foreign Application Priority Data

Nov. 25, 1981 [JP] Japan .......................... 56-174077[U]

[51] Int. Cl.³ .............................................. B60K 15/02
[52] U.S. Cl. .................................. 180/225; 55/385 B; 280/5 A
[58] Field of Search .............. 180/225, 219; 55/385 B, 55/DIG. 28; 280/5 A, 5 R

[56] References Cited

U.S. PATENT DOCUMENTS 576,158   2/1897  Rub ...................................... 180/225
4,321,978 3/1982  Tominaga ........................... 182/225
4,354,570 10/1982 Tanaka ........................... 180/225 X Primary Examiner—John A. Pekar
Attorney, Agent, or Firm—Irving M. Weiner; Pamela S. Burt; Anthony L. Cupoli

[57] ABSTRACT

An air intake system in a motorized cycle of the type wherein a fuel tank is disposed behind a top bridge. Within the fuel tank is formed an outside air introducing path having an opening formed in the front portion of the tank, with an air cleaner being disposed downstream of the outside air introducing path. With such arrangement, a relatively large flow of air can be introduced with a relatively small load on the air cleaner.

19 Claims, 18 Drawing Figures

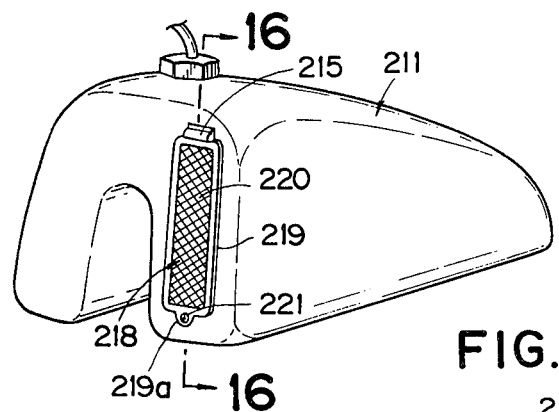
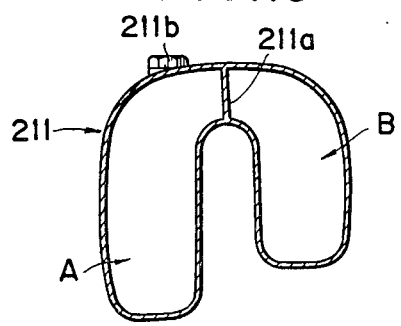
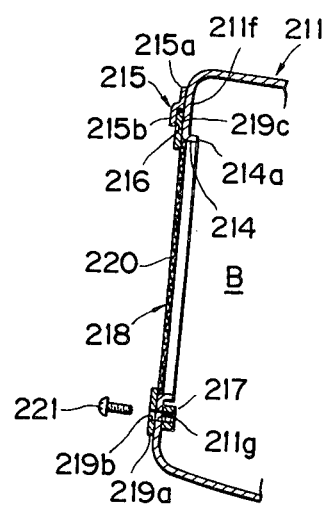
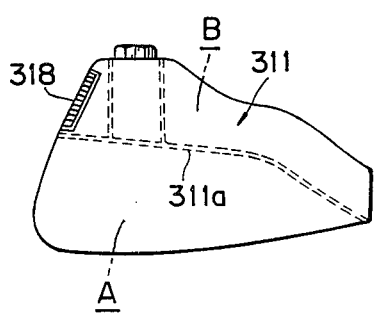
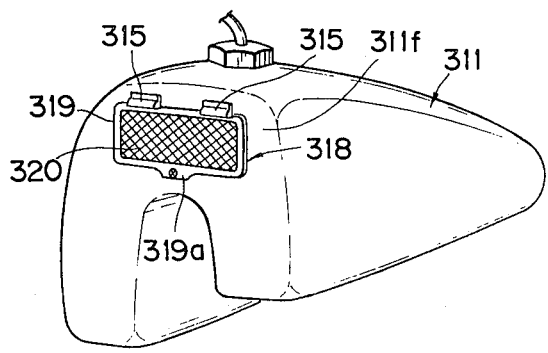

AIR INTAKE SYSTEM FOR MOTORIZED CYCLES

BACKGROUND OF THE INVENTION

1. Field of the Invention

The present invention relates generally to an air intake system for motorized cycles. More particularly, the invention relates to an air intake system for motorized cycles, such as motorized bicycles (e.g., motorcycles) and tricycles, wherein a fuel tank is disposed behind a top bridge.

2. Description of Relevant Art

Heretofore, motorized cycles such as motorcycles and motorized tricycles having a fuel tank disposed behind a top bridge, and most particularly, off-road motorized cycles such as moto-crossers and trial motorbikes, have generally been constructed so that an air cleaner case is disposed in front of a rear wheel and an outside air intake port of an engine is disposed above the air cleaner case and below the seat.

Consequently, during travel, the air cleaner element is highly susceptible to being affected by water, mud, dust or the like splashed up by the rear wheel.

To overcome the foregoing problem, it has been proposed to utilize the interior of the main pipe of the vehicular body frame for the intake of air from the vehicular front portion, or to extend an intake pipe up to the vehicular front portion. However, in the case of motorized cycles having engines with relatively large displacement, especially moto-crossers or the like, there have arisen problems with respect to the fact that the required intake volume of air is so large that it is impossible with the aforesaid proposed means to provide a sufficient sectional area of the air introducing path, by way of example.

The present invention effectively overcomes the above-mentioned problems encountered in conventional motorized cycles.

SUMMARY OF THE INVENTION

The present invention provides an air intake system in a motorized cycle having a top bridge and a fuel tank disposed substantially behind the top bridge, which intake system comprises an outside air introducing path formed in the interior of the fuel tank and having an outside air intake port which opens in the front portion of the fuel tank, and an air cleaner disposed downstream of the outside air introducing path.

It is an object of the present invention to provide an air intake system in a motorized cycle with a fuel tank disposed behind a top bridge, which affords intake of a relatively large flow of air and substantially prevents an air cleaner element from being subjected to contamination, thereby improving the service life of the air cleaner element.

It is another object of the present invention to provide an air intake system in the aforesaid type of motorized cycle which desirably dispenses with mounting and removing operations, attains reduction of the number of required component parts, and provides a simplified structure and improved mounting and maintenance characteristics.

It is a further object of the present invention to provide an air intake system in the aforesaid type of motorized cycle wherein the maintenance of an outside air introducing path is relatively improved.

The above and further objects, details and advantages of the present invention will become apparent from the following detailed description, when read in conjunction with the accompanying drawings.

BRIEF DESCRIPTION OF THE DRAWINGS

FIG. 14 is a perspective view of a fuel tank in an air intake system for a motorized cycle according to a fourth embodiment of the present invention.

FIG. 15 is a transverse sectional view of principal portions of the fuel tank of FIG. 14.

FIG. 16 is an enlarged sectional view taken along line 16—16 of FIG. 14.

FIG. 17 is a side view of a fuel tank in an air intake system for a motorized cycle according to a fifth embodiment of the present invention.

FIG. 18 is an enlarged perspective view of the fuel tank of FIG. 17.

DETAILED DESCRIPTION OF PREFERRED EMBODIMENTS

Figure 1:
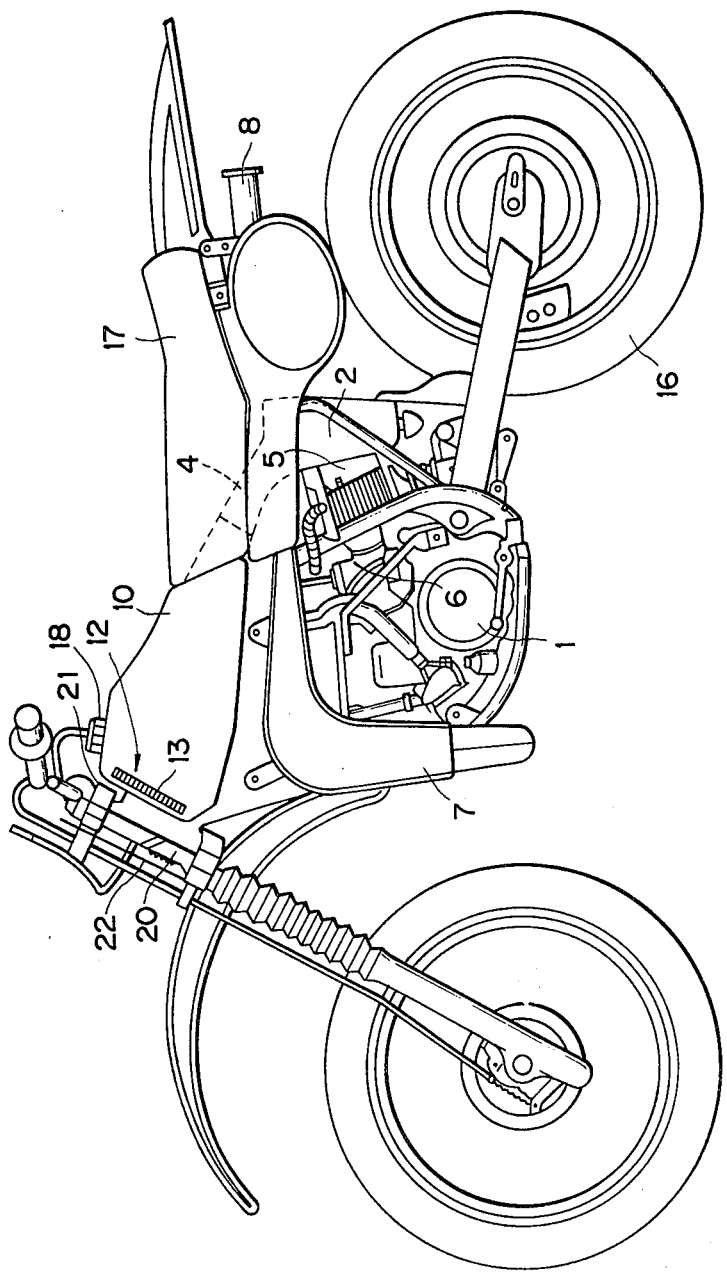
FIG. 1 is a side view of a two-wheeled motor vehicle provided with an air intake system according to a first embodiment of the present invention.

With reference to FIGS. 1 through 4 and particularly to FIG. 1, reference numeral 1 designates an engine disposed substantially centrally in the longitudinal direction of a two-wheeled motor vehicle. An air cleaner case 2 which is a component part of an air intake system for the engine 1 is disposed in front of a rear wheel 16 and below a seat 17, and an intake pipe 4 of the air cleaner case 2 is connected in an airtight manner to the rear end portion of a fuel tank 10 which is also a component part of the air intake system.

Figure 3:
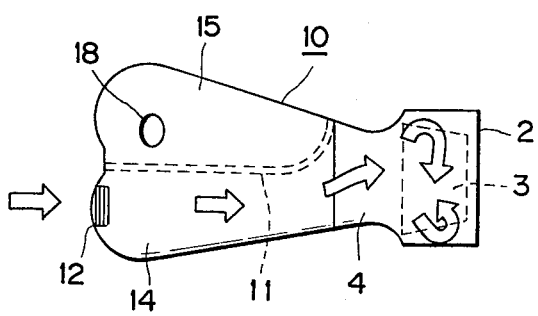
FIG. 3 is a plan view of the air intake system shown in FIG. 2.
Figure 4:
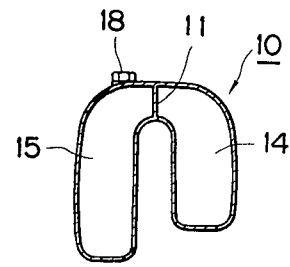
FIG. 4 is a transverse sectional view of principal portions of a fuel tank in the air intake system shown in FIG. 3.

The interior of the fuel tank 10 formed in a substantially inverted U-shape as shown in FIG. 4 is divided into two parts by a partition wall 11 extending substantially centrally and longitudinally of the tank 10 as shown in FIG. 3, one compartment 15 serving as a fuel storage chamber and the other compartment 14 serving as an intake air introducing path which is open in the front and rear.

Figure 2:
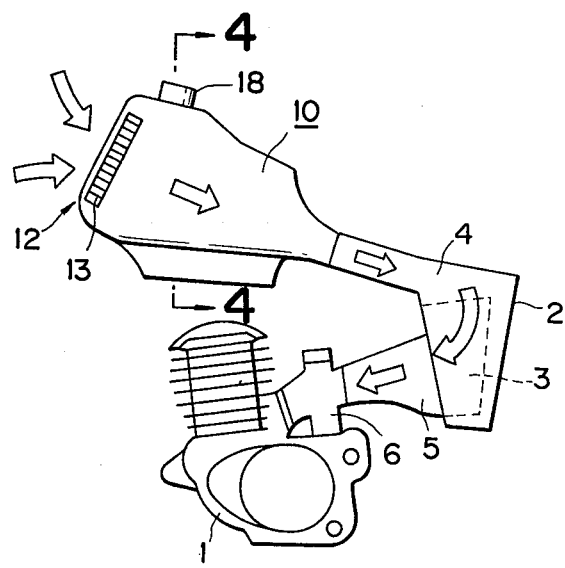
FIG. 2 is a side view of an engine and the air intake system in the two-wheeled motor vehicle of FIG. 1.

In a portion of the front wall of the fuel tank 10 on the side of partition wall 1 where the compartment 14 is located there is formed an opening 12 serving as an outside air intake port in a position behind a top bridge 21, as shown in FIG. 2, with a lattice 13 for preventing the entrance of foreign matter being attached to the opening 12.

As shown in FIGS. 2 and 3, the compartment 14 serving as the intake air introducing path is in smooth communication with the intake pipe 4 connected airtightly to the rear end portion of the fuel tank 10. Reference numeral 18 in FIG. 3 designates a fuel supply port communicating with the compartment 15.

As shown in FIG. 1, a front racing number plate 22 is attached to the front side of a head pipe 20, the plate 22 being disposed in front of the intake opening 12.

The outside air introducing side of the air cleaner case 2 is constructed as described hereinabove, while to the outlet port of the case 2 is airtightly connected a connecting tube 5 which at the other end thereof is connected to a carburetor, as shown in FIG. 2.

Further, as shown in FIG. 1, an expansion chamber 7 is connected to the exhaust port of the engine 1, and to the chamber 7 is connected a silencer 8.

With the intake and exhaust system of the engine 1 constructed as described hereinabove, while the engine 1 is in operation, the outside air is introduced from the intake opening 12 formed in the fuel tank 10, passes through the compartment 14 serving as the intake air introducing path and further through the intake pipe 4, and is then cleaned by an element 3 within the air cleaner case 2 and fed to the carburetor 6.

Therefore, even if water, mud, dust or the like is splashed up by the rear wheel 16 during travel on a rough road (particularly during off-road racing), the air cleaner element 3 is not substantially influenced by such foreign matter because the intake opening 12 is disposed in an upper position behind the top bridge 21. Foreign matter which may come flying from the front is also effectively prevented from entering the compartment 14 because the intake opening 12 is shielded by the front number plate 22 and the lattice 13 is attached to the opening 12.

In the present embodiment, moreover, because the interior of the fuel tank 10 is formed as an intake air introducing path, it is not necessary to separately provide a member for serving as such path, and the intake system is constructed compactly. Further, the cross-sectional area of the intake air introducing path can be formed large enough to accommodate even vehicles having engines of large displacements.

Further, because the intake opening 12 is disposed in a vehicular front position, it becomes possible to effectively utilize the driving wind pressure for the intake of air, and thus desirable engine performance is attained.

Figure 5:
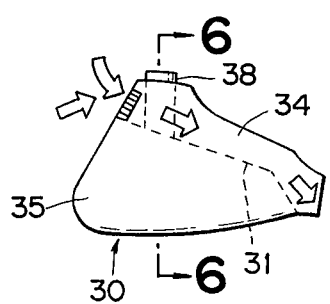
FIG. 5 is a side view of a fuel tank in an air intake system for a motorized cycle according to a second embodiment of the present invention.
Figure 6:
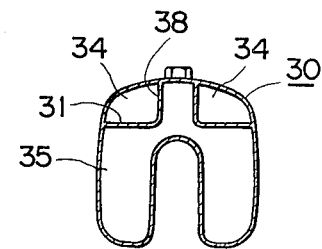
FIG. 6 is a sectional view taken along line 6—6 of FIG. 5.

Referring now to FIGS. 5 and 6, reference numeral 30 designates a fuel tank, the interior of which is divided by a transverse partition wall 31 into an upper intake air introducing path 34 and a lower fuel storage chamber 35, the fuel tank 30 performing substantially the same function and attaining substantially the same effect as in the above-described embodiment. Reference numeral 38 designates a fuel supply port which extends substantially vertically through the intake air introducing path 34.

Both of the embodiments described hereinabove are applicable to both on-road and off-road vehicles, but are particularly effective for off-road vehicles.

Figure 7:
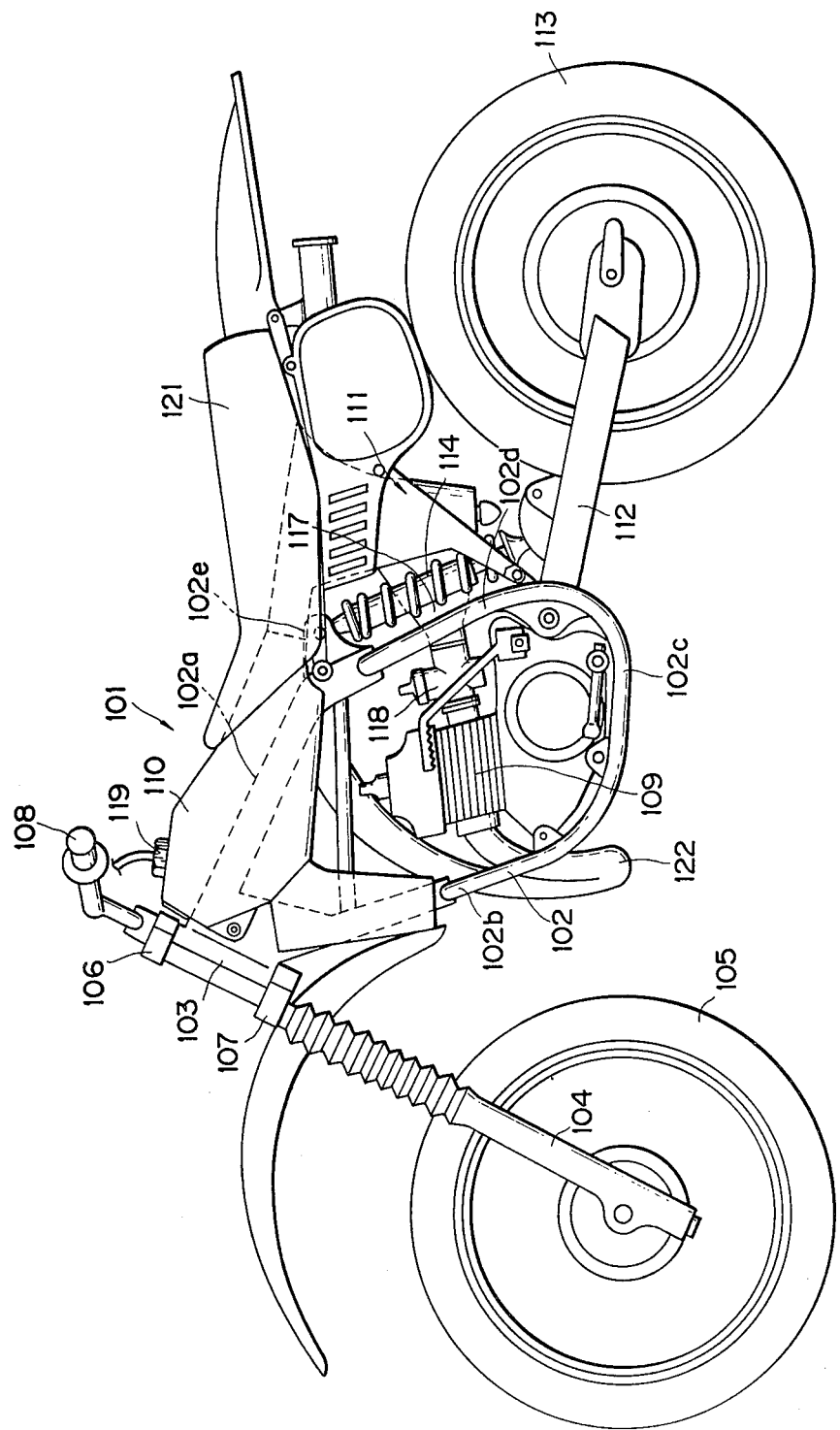
FIG. 7 is a side view of a two-wheeled motor vehicle provided with an air intake system according to a third embodiment of the present invention.

Referring now to FIGS. 7 through 13 and particularly to FIG. 7, reference numeral 101 designates a two-wheeled motor vehicle. To a head tube 103 at the front end of a front frame 102 of the vehicle 101 is attached a front fork 104 supporting a front wheel 105, the front fork 104 being supported for steering movement by top and bottom bridges 106 and 107, with a handlebar 108 being mounted on the top bridge 106.

Figure 10:
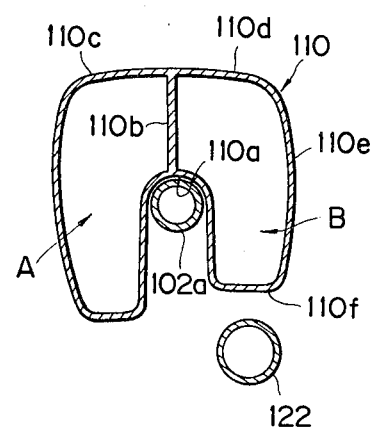
FIG. 10 is a sectional view taken along line 10—10 of FIG. 8.

The frame 102 comprises a main pipe 102a extending rearwardly from the upper portion of the head tube 103, a pair of down tubes 102b extending downwardly from the lower portion of the head tube 103, a pair of down tube lower portions 102c extending rearwardly from the lower ends of the down tubes 102b, and a pair of center pipes 102d inclined somewhat forwardly upwardly from the rear ends of the down tube lower portions 102c and connected to the rear end of the main pipe 102a. An engine 109 is mounted within the space surrounded by the main pipe 102a, down tubes 102b, down tube lower portions 102c and center pipes 102d. On the main pipe 102a, above the engine 109 is mounted a fuel tank 110 which is substantially inverted U-shaped, as shown in FIG. 10. The tank 110 has a longitudinally and downwardly opened groove 110a, within which is disposed the main pipe 102a in the longitudinal direction.

Figure 8:
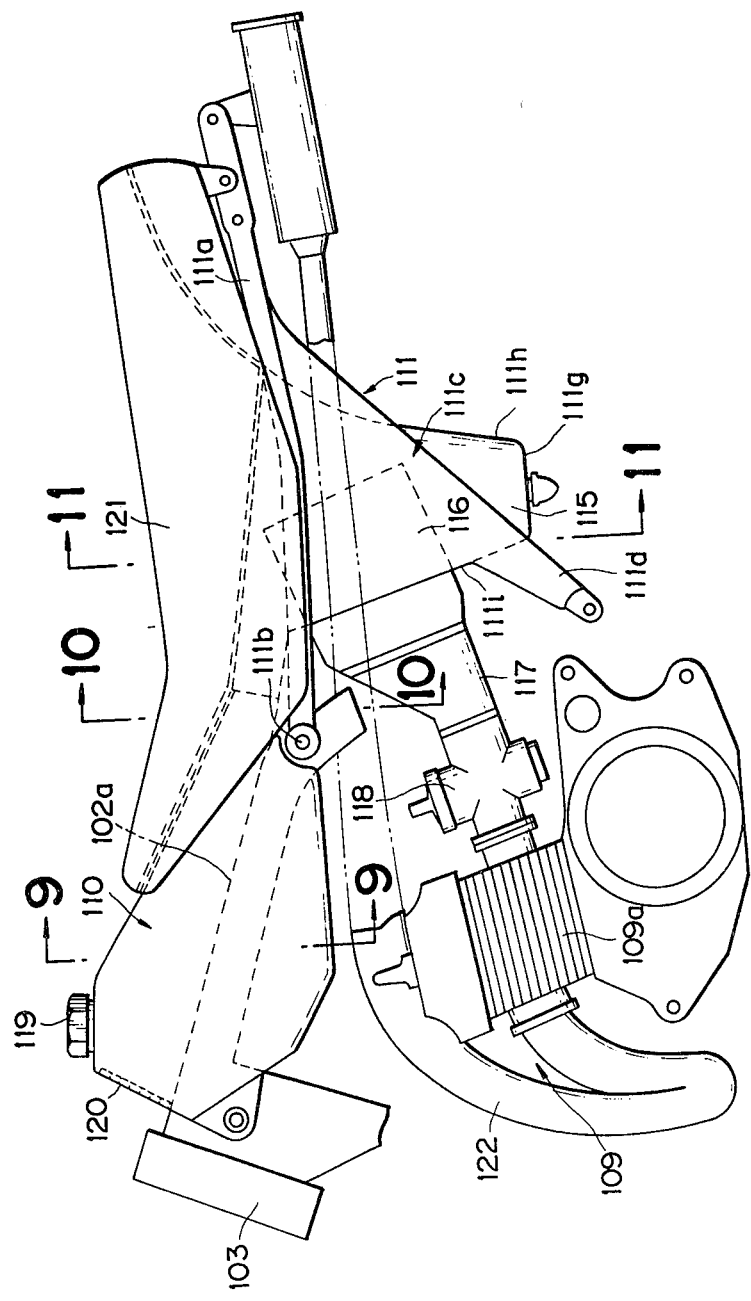
FIG. 8 is an enlarged side view of principal portions of the two-wheeled motor vehicle of FIG. 7.

Right and left upper pipes 111a serving as seat rails, as shown in FIG. 8, are fixed at their front ends to the rear portion of the main pipe 102a of the front frame 102 by means of a fixing member 111b, and from the front and rear of an intermediate portion of the upper pipe 111a a duct-shaped sub-member 111c having substantially a monocoque structure is suspended downwardly. The sub-member 111c, which is substantially triangular from a side view, has the lower end thereof extending forwardly downwardly to form a mounting portion 111d, which is fixed to the lower portion of the center pipe 102d, and thus a rear frame 111 is defined. A rear fork 112 which supports a rear wheel 113 extends pivotally rearwardly from the lower portion of the center pipe 102d of the front frame 102 near the mounting portion 111d as shown in FIG. 7, with a single rear cushion unit 114 being interposed between the front portion of the rear fork 112 and a bracket 102e attached to the rear end of the main pipe 102a. The rear cushion unit 114, connected at its lower end to the rear fork 112 through a link mechanism, has a progressive characteristic which gradually increases the cushioning force.

Figure 9:
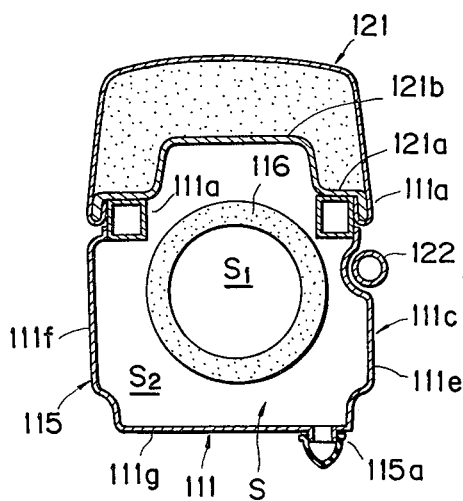
FIG. 9 is a sectional view taken along line 9—9 of FIG. 8.

The sub-member 111c of the rear frame 111 has an intermediate portion formed substantially in the shape of a box as shown in FIG. 9, and such intermediate portion is provided with right and left side plates 111e, 111f, a bottom plate 111g, a rear plate 111h and a front plate 111i, which plates 111h and 111i are shown in FIG. 8, thus substantially forming an air cleaner case 115. The upper side of the case 115 is open, and an air cleaner element (filter) 116 is mounted within a space S (FIG. 9) surrounded by the plates 111e through 111i. The element 116 is substantially cylindrical, and as shown in FIG. 8, its axis extends in a forwardly downwardly sloped longitudinal direction. A connecting tube 117 is connected to the front plate 111i to let a clean side $S_1$ (FIG. 9) defined by the element 116 communicate with the tube 117, and as shown in FIG. 8, the tube 117 is connected to a carburetor 118 disposed behind a cylinder 109a. In FIG. 9, reference numeral 115a designates a drain formed in the bottom plate 111g for the draining of water from a dirty side $S_2$ formed around the element 116.

Figure 11:
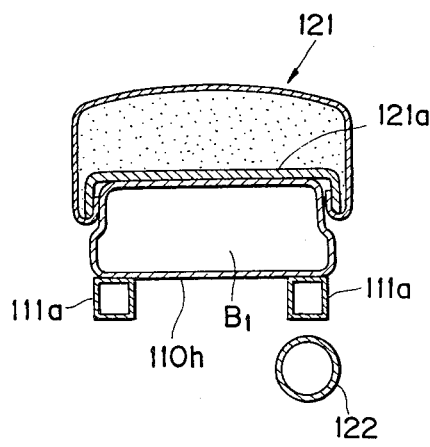
FIG. 11 is a sectional view taken along line 11—11 of FIG. 8.
Figure 12:
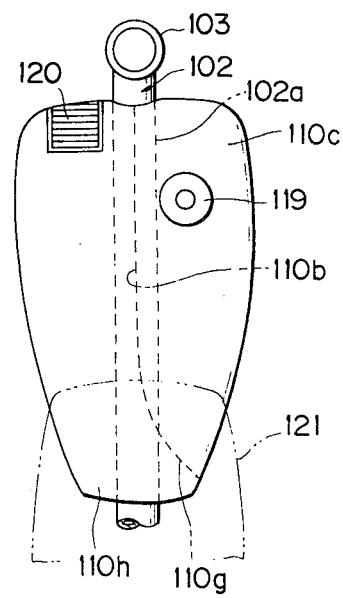
FIG. 12 is a plan view of a fuel tank and associated portions in the air intake system of FIG. 7 shown in FIGS. 10 and 11.
Figure 13:
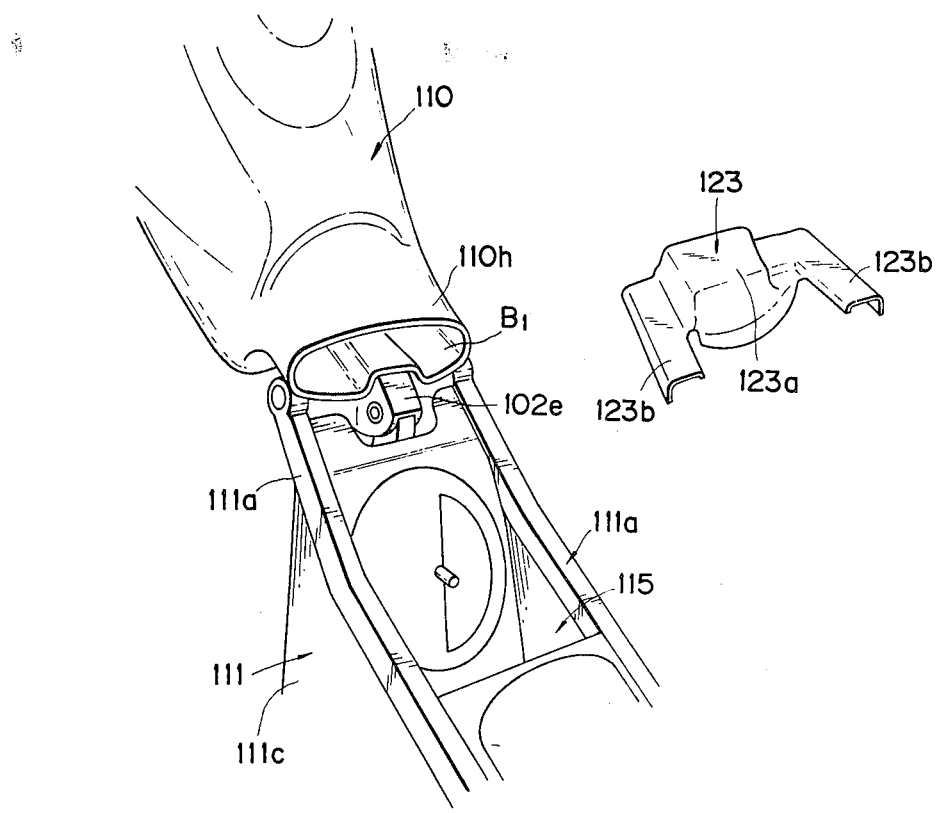
FIG. 13 is an enlarged perspective view of principal portions of the fuel tank and associated portions shown in FIG. 12.

The fuel tank 110, as shown in FIGS. 10 through 12, particularly as shown in FIG. 10, is divided into right and left chambers by means of a partition wall 110b disposed at a transversely intermediate portion of the tank 110. One chamber A is closed to form a fuel storage chamber. In this embodiment, the fuel storage chamber A is formed on the right side of the vehicle body, and as shown in FIG. 12, a fuel supply port adapted to be opened and closed by a cap 119 is provided on the front portion of an upper wall 110c on such side. Referring again to FIG. 10, the other chamber defined by the partition wall 110b in the tank 110 forms an air duct B serving as an intake passage. The air duct B, surrounded by an upper wall 110d, a side wall 110e, a bottom wall 110f and the partition wall 110b, is open in the front and rear, and as shown in FIG. 12, a screen 120 formed of a lattice or a wire-netting is fitted in the front opening portion for preventing entry of foreign matter. The tank 110 is formed so that its rear portion is smaller in both width and height, and a rear portion 110g of the partition wall 110b is curved to one side. Thus, as shown in FIG. 11, a rear portion $B_1$ of the duct B defines the passage within a rear portion 110h of the tank 110. Further, as shown in FIGS. 8 and 13, the rear portion 110h of the tank 110 faces the upper front portion of the air cleaner case 115 and communicates with the latter. Therefore, no separate connection pipe is required between the duct B and the air cleaner case 115.

Disposed behind the tank 110 is a seat 121 which is supported on the upper pipes 111a, as shown in FIGS. 8 and 11, the front portion of the seat 121 extending over the rear portion of the tank 110 to an intermediate portion thereof. A bottom plate 121a of the seat covers the upper surfaces 110c, 110d and the case 115 longitudinally. In the portion of bottom plate 121a above the case 115, as shown in FIG. 9, a transversely intermediate part is projected upwardly to form a raised portion 121b, whereby the capacity of the upper portion of the case 115 is substantially increased, while both lower sides of the bottom plate 121a are supported by the upper pipes 111a. As shown in FIGS. 12 and 13, moreover, the rear portion 110h of the tank is extended up to behind the main pipe 102a and the right and left lower sides of its bottom portion are supported by the front ends of the upper pipes 111a. In this embodiment, as shown in FIGS. 7 through 11, because an exhaust pipe 122 of the engine 109 is extended to an upper intermediate portion of the vehicular left side, the bottom wall 110f at the air duct B side is positioned higher than the bottom wall at the fuel storage chamber A side.

As shown in FIG. 13, the bracket 102e which supports the upper end of the rear cushion unit 114 projects from below the rear end of the fuel tank 110, and is covered with a cover 123. The cover 123 is provided at a transversely intermediate portion thereof with a guide portion 123a which faces the opening end of the duct rear portion $B_1$ for guiding air obliquely downwardly to the rear, and is further provided on both sides thereof with right and left support portions 123b which cover the front end portions of the upper pipes 111a.

Referring now to FIGS. 14 through 16, reference numeral 211 designates a fuel tank which forms a component part of an air intake system of an engine (not shown), the interior of which tank 211, as shown in FIG. 15, is divided by a longitudinal partition wall 211a into a storage portion A which permits storage of fuel and a duct portion B which permits intake air to pass therethrough, with a fuel supply portion 211b for the supply of fuel being formed in the upper part of the storage portion A.

In a front plate 211f of the fuel tank 211 is formed an air intake opening 214 in a position on the duct portion B side of tank 211, the opening 214 being longitudinally elongated in conformity with the duct portion B having a longitudinally elongated front face. As shown in FIG. 16, an inner peripheral edge 214a of the opening 214 is bent inwardly, and a base portion 215a of an engaging piece 215 having a substantially Z-shaped side is fixed to an upper peripheral portion of the opening 214 of the front plate 211f, while a tip portion 215b of the engaging piece 215 is suspended and together with the front plate 211f defines an engaging groove 216 which is opened transversely and downwardly. A nut 217 is fixed to the back of a lower peripheral portion of the opening 214 and a mounting hole 211g concentric with the nut 217 is formed in the front plate 211f.

As shown in FIG. 14, a dust-proof screen 218 is fitted in the opening 214, which screen 218 comprises a substantially rectangular, longitudinally elongated frame 219 and a net 220 held peripherally by the frame 219. As shown in FIG. 16, a mounting piece 219a is suspended from the lower central portion of the frame 219, with a mounting hole 219b being formed in the mounting piece 219a, while the net 220 is formed so as to have a size substantially the same as or slightly smaller than the opening 214. A central part of an upper portion 219c of the frame 219 is inserted and engaged from below in the engaging groove 216, the mounting hole 219b is aligned with the mounting hole 211g formed centrally in the lower side of the opening 214, and then a machine screw 221 is inserted through such holes from the exterior and threadedly engaged with the nut 219 to fix the lower portion of the frame 219 to the front plate 211f of the tank 211. In this manner, the screen 218 is mounted so as to cover the front of the opening 214, while it can be easily removed merely by removing the machine screw 221 and shifting the frame 219 downwardly.

In operation, intake air is introduced into the duct portion B through the screen 218 while mud, stones, dust or the like is reduced to a minimum by the screen 218. Even if mud, dust or the like should happen to enter the duct portion B through the meshes of the screen 218 and adhere to the inner wall of the duct portion B, the screen 218 can be removed from the opening 214 in the manner described hereinabove. Because the sectional area of the duct portion B is relatively large, the interior of the duct portion B can be easily cleaned and an adhered and accumulated mass of dust or the like, if any, can be readily removed. For example, if a communication pipe (not shown) with an air cleaner (not shown) is removed and compressed air or water is injected through the opening 214 into the duct portion B, it is possible to easily effect cleaning. In this manner, it is possible to effect efficient cleaning, which is not only very advantageous with respect to maintenance but also is highly desirable in off-road vehicles which are frequently driven on marshy grounds or mires.

Further, because the screen 218 is easily detachable as mentioned above, it is possible to separately provide a plurality of screens with nets having different mesh sizes and to select one in accordance with the particular road conditions, travel conditions, weather conditions, etc.

Referring now to FIGS. 17 and 18, reference numeral 311 designates a fuel tank which is a component part of an air intake system of an engine (not shown). The fuel tank 311, as shown in FIG. 17, is divided by a transverse partition wall 311a into a lower fuel storage portion A and an upper intake duct portion B, with a screen 318 being fitted in an opening (not shown) formed in a front plate 311f of the tank 311 at the duct portion B side. As shown in FIG. 18, the screen 318 comprises a relatively transversely long frame 319 and a net 320 supported by the frame 319. The frame 319 is held in place at its upper portion by a pair of right and left retaining pieces 315 and at its lower portion by fixing a substantially centrally suspended mounting piece 319a to a front plate 311f of the tank 311 with a machine screw.

Although in the above-described embodiments the screen 218 or 318 is constructed of a net, it will be understood that a lattice, perforated board, or the like may alternatively be employed.

Although there have been described what are at present considered to be the preferred embodiments of the present invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

We claim:

1. In a motorized cycle having a top bridge and a fuel tank disposed substantially behind said top bridge, an air intake system comprising:
   an outside air introducing path formed in the interior of said fuel tank by means of a partition, so as to be separated from the fuel, and having an outside air intake opening formed in the front portion of said tank; and
   an air cleaner disposed downstream of said air introducing path.

2. An air intake system according to claim 1, wherein:
   said fuel tank comprises a tank casing having a substantially inverted U-shaped section and an external shape extending substantially symmetrically in the longitudinal direction;
   said casing having formed therein a storage chamber for storing fuel; and
   said introducing path is defined by said casing and isolated from said storage chamber by means of a partition.

3. An air intake system according to claim 2, wherein:
   said partition comprises a longitudinal partition wall; and
   said longitudinal partition wall extends substantially in the longitudinal direction from the front to an intermediate portion of said casing and is curved toward the storage chamber side of said casing at the rear portion of said casing.

4. An air intake system according to claim 3, wherein:
   said partition comprises a transverse partition wall extending flatwise substantially in the longitudinal direction.

5. An air intake system according to claim 4, wherein: a screen is fitted in said intake opening.

6. An air intake system according to claim 2, wherein: said tank is disposed at a front portion of a frame of said motorized cycle.

7. An air intake system according to claim 2, wherein: a screen is fitted in said intake opening.

8. An air intake system according to claim 3, wherein: a screen is fitted in said intake opening.

9. An air intake system according to claim 1, wherein: said tank is disposed at a front portion of a frame of said motorized cycle.

10. An air intake system according to claim 9, wherein said motorized cycle further comprises:
    a driver's seat disposed in a position behind said tank;
    said cleaner further comprising a duct having an upstream portion thereof in direct communication with said introducing path; and
    a cleaning element mounted downstream of said duct, said duct being partially defined by a bottom portion of said seat.

11. An air intake system according to claim 10, wherein:
    the remaining portion of said duct is defined by a substantially box-shaped member having a substantially monocoque structure.

12. An air intake system according to claim 11, wherein:
    said front portion of said frame includes a pair of right and left upper members extending substantially in the longitudinal direction;
    said seat is supported at said bottom portion thereof by said upper members; and
    said box-shaped member is suspended from said upper members.

13. An air intake system according to claim 9, wherein:
    the front portion of said seat extends substantially along the upper rear surface of said tank.

14. An air intake system according to claim 13 wherein:
    said front portion of said frame includes a main frame member extending substantially in the longitudinal direction; and
    said tank is mounted astride said main frame member.

15. An air intake system according to claim 9, wherein:
    a screen is fitted in said intake opening.

16. An air intake system according to claim 1, wherein:
    a screen is fitted in said intake opening.

17. An air intake system according to claim 16, wherein:
    said screen is detachable.

18. An air intake system according to claim 17, wherein:
    said tank is provided at the front portion thereof with a substantially flat front surface extending substantially in the vertical direction;
    said intake opening is provided in said front surface and has a substantially rectangular shape and a size which permits access to the interior of said introducing path; and
    said screen is arranged so as to cover said intake opening and is substantially similar in shape to said intake opening.

19. An air intake system according to claim 18, wherein:
    said screen is retained, at least at one point of the upper portion thereof in a downwardly removable manner and at one point of the lower portion thereof with a machine screw, at said front surface of said tank.

* * * * *